US010423680B2

United States Patent
Dehnashi et al.

(10) Patent No.: US 10,423,680 B2
(45) Date of Patent: Sep. 24, 2019

(54) KEYBOARD COMMAND AND CONTROL IN A CUSTOMER RELATIONSHIP MANAGEMENT (CRM) SYSTEM

(71) Applicant: SugarCRM Inc., Cupertino, CA (US)

(72) Inventors: Nima Dehnashi, San Jose, CA (US); Julien Girault, San Jose, CA (US)

(73) Assignee: SUGARCRM INC., Cupertino, CA (US)

( * ) Notice: Subject to any disclaimer, the term of this patent is extended or adjusted under 35 U.S.C. 154(b) by 862 days.

(21) Appl. No.: 14/663,869

(22) Filed: Mar. 20, 2015

(65) Prior Publication Data

US 2016/0274763 A1    Sep. 22, 2016

(51) Int. Cl.
*G06F 3/0481*    (2013.01)
*G06Q 30/00*    (2012.01)
*G06F 17/30*    (2006.01)
*G06F 16/9535*    (2019.01)
*G06F 3/0489*    (2013.01)

(52) U.S. Cl.
CPC ........ *G06F 16/9535* (2019.01); *G06F 3/0489* (2013.01); *G06Q 30/016* (2013.01)

(58) Field of Classification Search
CPC .......................... G06F 3/04817; G06Q 30/016
See application file for complete search history.

(56) References Cited

U.S. PATENT DOCUMENTS

| 8,745,018 | B1* | 6/2014 | Singleton | .......... G06F 17/30899 707/705 |
| 2010/0231533 | A1* | 9/2010 | Chaudhri | ............ G06F 3/04817 345/173 |
| 2012/0150979 | A1* | 6/2012 | Monaco | ............... G06Q 10/107 709/206 |
| 2013/0185336 | A1* | 7/2013 | Singh | .................. G06F 17/2785 707/794 |

(Continued)

OTHER PUBLICATIONS

Adam Dachis, Six Keyboard Shortcuts Every Computer user Should Know, 3 pages (Year: 2011).*

(Continued)

*Primary Examiner* — Ryan F Pitaro
*Assistant Examiner* — Parmanand D Patel
(74) *Attorney, Agent, or Firm* — Steven M. Greenberg, Esq.; Shutts & Bowen LLP

(57) ABSTRACT

Embodiments of the invention provide for keyboard command and control in a customer relationship management (CRM) system. A method for keyboard command and control in a CRM system includes detecting a pre-determined combination of keyboard strokes occurring in a user interface of a CRM application and in response, a global search window is displayed. Thereafter, a sequence of textual characters are received into a text input control of the window and for each received character, a reference to one or more data objects at least partially matching the received character and stored in connection with the CRM application are located. For each located object, a corresponding pro- (Continued)

gram module of the CRM application is determined and each located reference is aggregated with an icon for a corresponding one of the program modules. Finally, the aggregated reference and icon are displayed as an activatable entry in a result set in the window.

15 Claims, 2 Drawing Sheets

(56) References Cited

U.S. PATENT DOCUMENTS

2014/0244619 A1* 8/2014 Doroshenko ..... G06F 17/30126 707/722
2014/0365671 A1* 12/2014 Petersen ............... H04W 4/021 709/227

OTHER PUBLICATIONS

Adam Dachis, Six keyboard shortcuts every user should know, 3 pages (Year: 2011).*

* cited by examiner

KEYBOARD COMMAND AND CONTROL IN A CUSTOMER RELATIONSHIP MANAGEMENT (CRM) SYSTEM

BACKGROUND OF THE INVENTION

Field of the Invention

The present invention relates to CRM data processing and more particularly to command and control in a CRM application.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

CRM systems are often used to manage the entire life-cycle of a relationship between a customer and an organization. In this regard, a CRM system is enabled to manage tasks for organizational representatives associated with the targeting and acquisition of a new customer, the fulfillment of a sale to a new customer or an existing customer, and the maintenance of a relationship with an existing customer. Much of the role of the CRM system is to store data documenting the relationship between representatives of an organization and its customers and prospective customers. Thus, the typical CRM system takes a long view of the customer relationship from inception to conclusion which may last many years or even decades.

CRM systems can be quite complicated in structure and size, primarily due to the vast amount of data managed and the different ways in which the data is visualized in order to facilitate CRM. To locate data of interest often requires some a priori knowledge at least of the particular program module of the CRM system in which the data appears. Likewise, to effectuate a directive in the CRM system generally requires the a priori knowledge at least of the menu hierarchy of the CRM system in which a desired command can be found. Thus, much of the challenge in working with a CRM system involves the tedious transition from mouse to keyboard and back to mouse as the end user manually navigates the CRM system to the relevant portion in which a desired record can be located or a desired action effectuated.

BRIEF SUMMARY OF THE INVENTION

Embodiments of the present invention address deficiencies of the art in respect to CRM command and control and provide a novel and non-obvious method, system and computer program product for keyboard command and control in a CRM system. In an embodiment of the invention, a method for keyboard command and control in a CRM system includes detecting a pre-determined combination of keyboard strokes occurring in a user interface of a CRM application. In response to the detection of the pre-determined combination of keyboard strokes, a global search window is displayed in the CRM application. Thereafter, a sequence of textual characters are received into a text input control of the window and for each received character of the sequence, a reference to one or more data objects at least partially matching the received character and stored in connection with the CRM application are located. For each located data object, a corresponding program module of the CRM application is determined and each located reference is aggregated with an icon for a corresponding one of the program modules. Finally, the aggregated reference and icon are displayed as an activatable entry in a result set in the window.

In one aspect of the embodiment, for each character of the sequence, initially a cache of previously aggregated references and icons are searched to locate the data objects partially matching the character, and subsequently a data store storing data objects for all modules of the CRM application are searched to locate the data objects partially matching the character. In another aspect of the embodiment, for each character of the sequence, meta-data for the CRM application describing system commands of the CRM application additionally are searched to locate data objects that are system commands at least partially matching the character. In respect to the former aspect, each entry in the result set is placed in the cache but subsequently removed from the cache after a lapse of a threshold period of time. In respect to the latter aspect, an activation of an entry in the result set that is a system command results in an address being placed in an address bar of a content browser acting as a container for the CRM application so as to invoke the system command as if the system command had been manually selected in the CRM application, or an activation of an entry in the result set that is a system command results in an event being placed in an event handler for the CRM application to invoke the system command as if the system command had been manually selected in the CRM application.

In another embodiment of the invention, a CRM data processing system is provided. The system includes a host computing system that includes one or more computers, each with memory and at least one processor and a CRM application executing in the memory of the host computing system. The CRM application itself includes a multiplicity of program modules, such as an account modules, a contact module, a leads module, a campaign module, an opportunities module, a projects module and a cases module. The system yet further includes a data store of data objects stored in connection with each of the program modules of the CRM application. Finally, the system includes a keyboard command and control module.

The keyboard command and control module includes program code enabled upon execution in the memory of the host computing system to detect a pre-determined combination of keyboard strokes occurring in a user interface of the CRM application, and to respond to the detection of the pre-determined combination of keyboard strokes by displaying a global search window in the CRM application, by receiving into a text input control of the window a sequence of textual characters, by locating for each received character of the sequence a reference to one or more data objects in the data store at least partially matching the received character and stored in connection with the CRM application, by determining for each located data object a corresponding one of the program modules of the CRM application, by aggregating each located reference with an icon for a corresponding one of the program modules, and by displaying the aggregated reference and icon as an activatable entry in a result set in the window.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for keyboard command and control in a CRM system that includes different program modules, each module performing a different function of a CRM application, such as an account modules, a contact module, a leads module, a campaign module, an opportunities module, a projects module and a cases module. In accordance with an embodiment of the invention, a global search user interface can be displayed in response to a keyboard event received in an event handler of the CRM system irrespective of the presence of any one of the modules. A sequence of textual characters can be received into a buffer in association with the global search user interface, and in response to the receipt of each character, program logic of the global search user interface retrieves a reference to one or matching data objects stored in connection with the CRM application and determines for each data object, a corresponding one of the program modules. Each retrieved reference is then aggregated with an icon for a corresponding one of the program modules and displayed as an activatable entry in a result set in the user interface. Consequently, activation of any one of the entries in the result set results in a retrieval of a referenced data object from within a corresponding one of the program modules.

Figure 1:
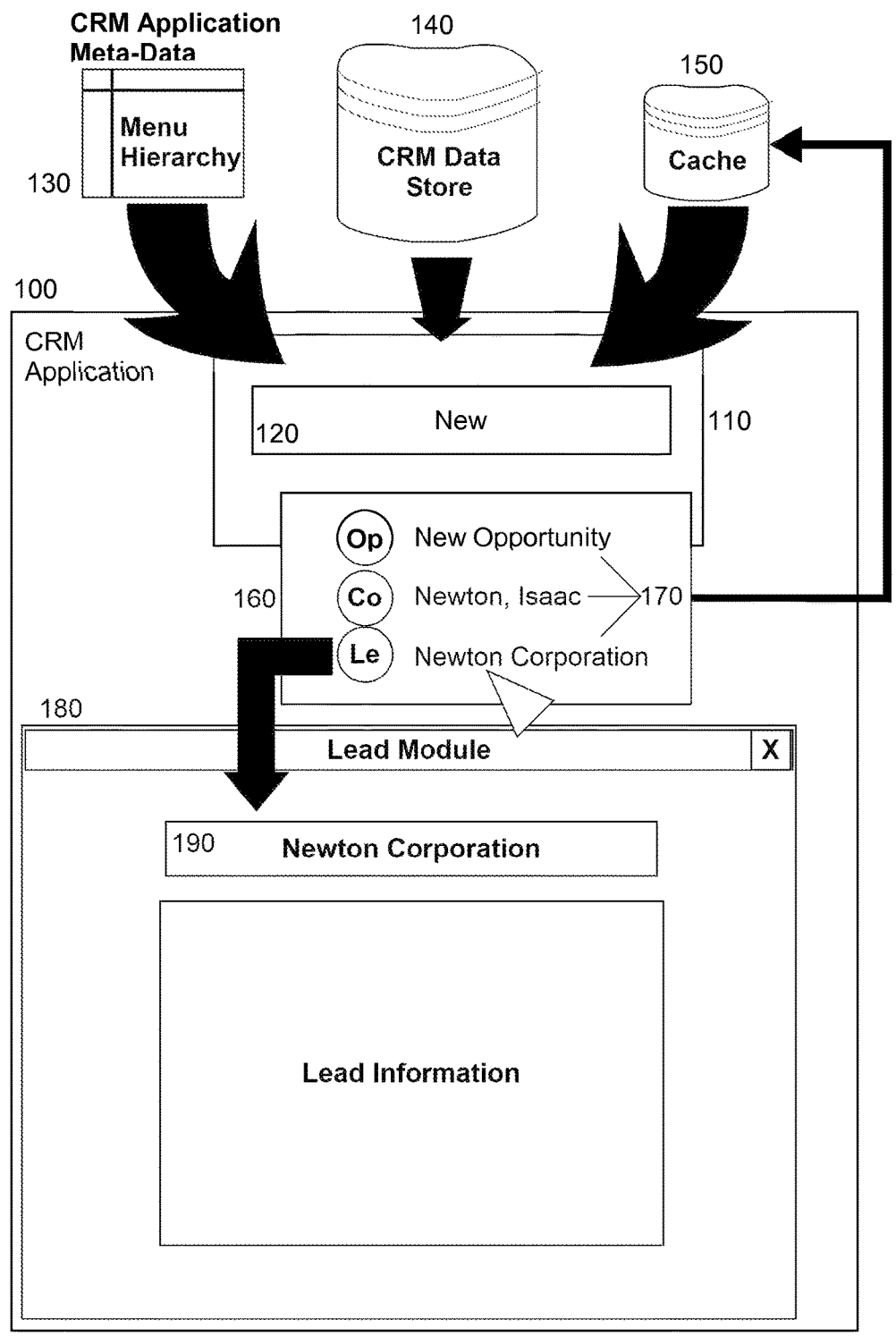
FIG. 1 is a pictorial illustration of a process for keyboard command and control in a CRM system

In further illustration, FIG. 1 pictorially shows a process for keyboard command and control in a CRM system. In accordance with an embodiment of the invention, a CRM application 100 that includes multiple different program modules, can respond to the detection of one or more keystrokes by displaying a windows 110 that includes a text input control 120. The text input control 120 can receive the sequential input of different characters responsive to the receipt of each character, logic associated with the window 110 can query each of CRM application meta-data 130 describing a hierarchy of menu commands available for access in different menus of the CRM application, a CRM data store 140 of different data objects created in and accessible through the different modules of the CRM application 100, and a cache 150 storing recent results produced by prior queries by the logic associated with the window 110.

Results from querying the cache 150 matching the characters of entered in the text input control 120 can be inserted as entries 170 in a result set 160. Also, results from querying the CRM application meta-data 130 and the CRM data store 140 including references to either system commands including both menu entries and commands not accessible by a menu hierarchy of the CRM application 100, or data objects, respectively, can be aggregated with corresponding icons for respective ones of the modules of the CRM application 100 associated with the references. Each of the aggregations in turn can be inserted into the result set 160 as a different entry 170 that is activatable upon selection. Once an entry 170 in the result set 160 has been activated, a module user interface 180 for an associated one of the modules can be invoked and a corresponding record for the reference of the entry 170 displayed in the module user interface 180. Finally, the entries 170 in the result set 160 can be inserted into the cache 150 for a limited period of time, for instance a matter of minutes, before the entries 170 are flushed from the cache 150.

Of note, to the extent an activated one of the entries 170 is a system command accessible in a module user interface 180 for an associated one of the modules, or for the CRM application 100 in general, the system command can be invoked as if the system command had been manually selected in the module user interface 180 or in a user interface to the CRM application 100. In this regard, a uniform resource locator (URL) for a user interface associated with the system command can be constructed and activated in a content browser through which the CRM application 100 is accessed. Alternatively, an event indicating the selection of the system command can be inserted in an event handler for the CRM application 100 as if the system command had been selected manually. For instance, the system command can include a command to create a data object associated with a particular one of the modules of the CRM application 100 in consequence of which a user interface corresponding to the system command and the particular one of the modules can be displayed and into which data pertaining to the creation of the data object can be received. Finally, as a special case of input to the input control 120, a linking command can be detected in the text input control 120 in response to which a record filter user interface is displayed in which different data objects of the CRM data store 140 can be selected for a stored association with one another.

Figure 2:
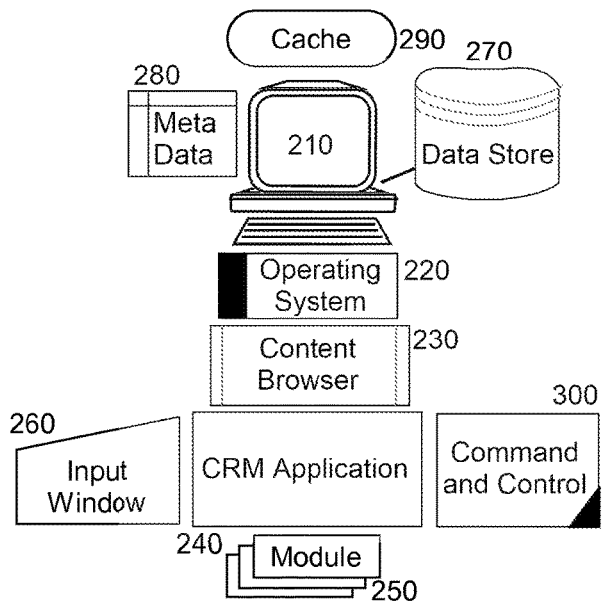
FIG. 2 is a schematic illustration of a CRM data processing system configured for keyboard command and control; and, FIG. 3 is a flow chart illustrating a process for keyboard command and control in a CRM system.

The process described in connection with FIG. 1 can be implemented in a CRM data processing system. In yet further illustration, FIG. 2 schematically shows a CRM data processing system configured for keyboard command and control. The system can include a host computing system 210 that includes one or more computers, each with memory and at least one processor. An operating system 220 can execute in the host computing system 210 and can support the operation of a content browser 230 in which a CRM application 240 of multiple different modules 250 can be accessed. In this regard, data objects stored in a data store 270 can be created, modified, viewed and removed through the different modules 250 of the CRM application 240 by way of the content browser 230.

Of note, a keyboard command and control module 300 can be coupled to the CRM application 240. The module 300 can include program code enabled upon execution in the memory of the host computing system 210 to respond to the striking of one or more keyboard keys by displaying an input window 260 in the CRM application 240 through the content browser 230. The input window 260 can receive the input of a sequence of keyboard characters. In response to the receipt of each character, a reference to one or more data objects at least partially matching the received character and stored in the data store 270 can be located. Alternatively, one or more prior search results in the cache 290 can be located that matches at least partially the received characters in the input window 260.

As even yet another alternative, a reference to one or more system commands in CRM application meta-data 280 can be located. In this regard, the meta-data 280 can be a separately stored file or database, or the meta-data 280 can be encapsulated within executable script embedded within the markup of a Web page. The meta-data 280 can include not only menu commands of a hierarchy of menu commands for the CRM application 240, but also other available commands not necessarily invoked by a menu item in the hierarchy of menu commands. Examples include user logout, help display, system update checking, tracking enablement and disablement, backup triggering, system settings management such as the activation or de-activation of a developer mode, the modification of a system logger level, or the changing of a time zone. Other examples include the building of a module by way of a module loader, or the triggering of a specified workflow. Optionally, the meta-data 280 additionally can provide for the triggering of an application programming interface (API) endpoint. Finally, the meta-data 280 can specify one or more pre-defined actions each accessible by one or more end user defined hot-key or shortcut keys.

In any case, for each located data object, the program code of the module 300 is enabled to determine a corresponding one of the program modules 250 of the CRM application 240 and the program code of the module 300 is enabled to aggregate each located reference with an icon for a corresponding one of the program modules 250. The program code of the module 300 then displays each aggregated result as an activatable entry in a result set in the input window 260. Of import, the program code of the module 300 then places each entry in the result set into the cache 290, but subsequently the program code of the module 300 removes any entry in the cache that had remained in the cache 290 beyond a threshold period of time—for instance beyond five minutes. Optionally, to the extent that an entry in the result set refers to a pre-defined action located within the meta-data 280, the entry is promoted to a top of the result set so as to be prominently displayed in the input window 260.

Figure 3:
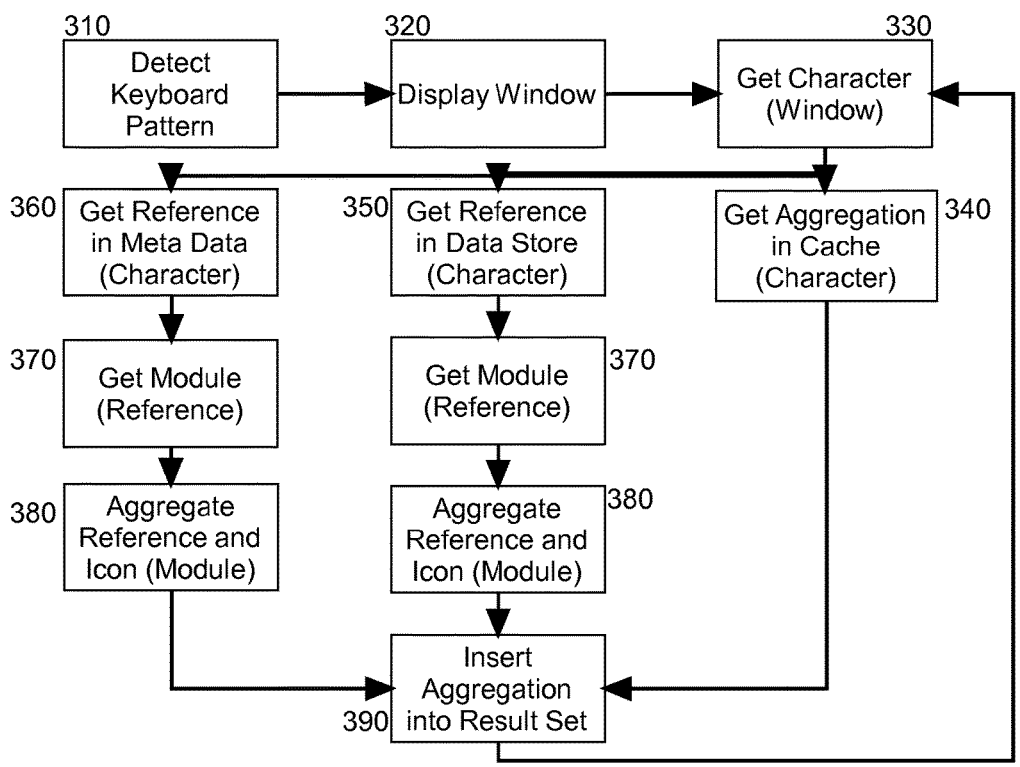

In even yet further illustration of the operation of the keyboard command and control module 300, FIG. 3 is a flow chart illustrating a process for keyboard command and control in a CRM system. Beginning in block 310, a keyboard pattern is detected in the CRM application and, in response, an input window is displayed in a user interface to the CRM application. In block 330, a first character is received as keyboard input in the input window. In response to the receipt of the first character, in blocks 340, 350 and 360, each of a cache of prior results, a CRM data store of data objects of the CRM application and meta-data for the CRM application including the different system commands are searched for entries at least partially matching the first character. Optionally, the entries can be filtered, or limited to those entries relevant to a contemporaneous context of the CRM application. In this regard, the data model for a contemporaneously active module of the CRM application can be inspected so as to identify a context of the module. As such, data for a current state of a module of the CRM application or the CRM application itself can be determined. Alternatively, a portion of a uniform resource locator (URL) directed to a user interface of a contemporaneously active module of the CRM application can be inspected so as to identify a context of the module. In this instance, one or more keywords present in the URL can be used to identify the context.

In this regard, in blocks 340, 350 and 360, each of a cache of prior results, a CRM data store of data objects of the CRM application and meta-data for the CRM application including a hierarchy of menu commands are searched for entries at least partially matching the first character and associated with a module of the CRM application contemporaneously active at the time the input window is displayed in the user interface to the CRM application. For example, a search for a report in the context of a contemporaneously active particular module of the CRM application can result in a return of reports pertinent to the contemporaneously active particular module of the CRM application. Optionally, the search can include keywords indicative of a desired type of the report such as "pie cart" or "bar chart", a particular filter for data to be applied in forming the report, and a delivery modality of a report, such as by way of e-mail to a particular end user of the CRM application, or by way of storing the report in a file to a particular storage location.

With respect to the system commands of the meta-data and the data objects in the data store, for each resultant reference to a system command or data object, a module can be determined that corresponds to the system command or data object can be determined in block 370 and in block 380, an icon for the corresponding module is aggregated with the reference to produce a result for insertion into a result set in the input window in block 390. Thereafter, a next character can be received in the input window in block 330 and the process can repeat for so long as the input window is not dismissed from display in the user interface of the CRM application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A method for keyboard command and control in a customer relationship management (CRM) system, the method comprising:
    detecting a pre-determined combination of keyboard strokes occurring in a user interface of a CRM application; and,
    responding to the detection of the pre-determined combination of keyboard strokes by displaying a global search window in the CRM application, by receiving into a text input control of the window a sequence of textual characters, by locating for each received character of the sequence a reference to one or more data objects at least partially matching the received character and stored in connection with the CRM application wherein the data objects comprise different reports stored in the CRM application, by locating for each received character of the sequence an additional reference to one or more types of the data objects at least partially matching the received character for each located data object wherein the types of data objects comprise different types of graphs of the reports, by determining for each located data object a corresponding program module of the CRM application, by aggregating each located reference with an icon for a corresponding one of the program modules, and by displaying the aggregated reference, a description of the type of data object and icon as an activatable entry in a result set in the window wherein the aggregated reference, description and icon of a corresponding contemporaneously active program module is prioritized in the result set;
    wherein for each character of the sequence, meta-data for the CRM application describing system commands of the CRM application additionally are searched to locate data objects that are system commands at least partially matching the character wherein the system commands comprise a command to create a new data object, additionally determining for each located system command data object a corresponding program module of the CRM application, by aggregating each located system command reference with an icon for a corresponding one of the program modules, and additionally displaying the aggregated system command reference and icon as an activatable entry in the result set in the window wherein the system command reference and icon of the corresponding contemporaneously active program module is prioritized in the result set,
    wherein the system commands further comprise user logout, help display, system update checking, tracking enablement and disablement, backup triggering, activation of a developer mode, de-activation of the developer mode, modification of a system logger level, changing of a time zone, building of a module by way of a module loader and the triggering of a specified workflow.

2. The method of claim 1, wherein for each character of the sequence, initially a cache of previously aggregated references and icons are searched to locate the data objects partially matching the character, and subsequently a data store storing data objects for all modules of the CRM application are searched to locate the data objects partially matching the character.

3. The method of claim 2, wherein each entry in the result set is placed in the cache but subsequently removed from the cache after a lapse of a threshold period of time.

4. The method of claim 1, wherein an activation of an entry in the result set that is a system command results in an address being placed in an address bar of a content browser acting as a container for the CRM application so as to invoke the system command as if the system command had been manually selected in the CRM application.

5. The method of claim 1, wherein an activation of an entry in the result set that is a system command results in an event being placed in an event handler for the CRM application to invoke the system command as if the system command had been manually selected in the CRM application.

6. A customer relationship management (CRM) data processing system, comprising:
    a host computing system that includes one or more computers, each with memory and at least one processor;
    a CRM application executing in the memory of the host computing system, the CRM application comprising a multiplicity of program modules;
    a data store of data objects stored in connection with each of the program modules of the CRM application; and,
    a keyboard command and control module, the module comprising program code enabled upon execution in the memory of the host computing system to detect a pre-determined combination of keyboard strokes occurring in a user interface of the CRM application, and to respond to the detection of the pre-determined combination of keyboard strokes by displaying a global search window in the CRM application, by receiving into a text input control of the window a sequence of textual characters, by locating for each received character of the sequence a reference to one or more data objects in the data store at least partially matching the received character and stored in connection with the CRM application wherein the data objects comprise different reports stored in the CRM application, by locating for each received character of the sequence an additional reference to one or more types of the data objects at least partially matching the received character for each located data object wherein the types of data objects comprise different types of graphs of the reports, by determining for each located data object a corresponding one of the program modules of the CRM application, by aggregating each located reference with an icon for a corresponding one of the program modules, and by displaying the aggregated reference, a description of the type of data object and icon as an activatable entry in a result set in the window wherein the aggregated reference, description and icon of a corresponding contemporaneously active program module is prioritized in the result set;
    wherein for each character of the sequence, meta-data for the CRM application describing system commands of the CRM application additionally are searched to locate data objects that are system commands at least partially matching the character wherein the system commands comprise a command to create a new data object, additionally determining for each located system command data object a corresponding program module of the CRM application, by aggregating each located system command reference with an icon for a corresponding one of the program modules, and additionally displaying the aggregated system command reference and icon as an activatable entry in the result set in the window wherein the system command reference and icon of the corresponding contemporaneously active program module is prioritized in the result set, wherein the system commands further comprise user logout, help display, system update checking, tracking enablement and disablement, backup triggering, activation of a developer mode, de-activation of the developer mode, modification of a system logger level, changing of a time zone, building of a module by way of a module loader and the triggering of a specified workflow.

7. The system of claim 6, wherein for each character of the sequence, initially a cache of previously aggregated references and icons are searched to locate the data objects partially matching the character, and subsequently a data store storing data objects for all modules of the CRM application are searched to locate the data objects partially matching the character.

8. The system of claim 7, wherein each entry in the result set is placed in the cache but subsequently removed from the cache after a lapse of a threshold period of time.

9. The system of claim 6, wherein an activation of an entry in the result set that is a system command results in an address being placed in an address bar of a content browser acting as a container for the CRM application so as to invoke the system command as if the system command had been manually selected in the CRM application.

10. The system of claim 6, wherein an activation of an entry in the result set that is a system command results in an event being placed in an event handler for the CRM application to invoke the system command as if the system command had been manually selected in the CRM application.

11. A computer program product or keyboard command and control in a customer relationship management (CRM) system, the computer program product comprising a computer readable storage medium having program instructions embodied therewith, the program instructions executable by a device to cause the device to perform a method comprising:

detecting a pre-determined combination of keyboard strokes occurring in a user interface of a CRM application; and, responding to the detection of the pre-determined combination of keyboard strokes by displaying a global search window in the CRM application, by receiving into a text input control of the window a sequence of textual characters, by locating for each received character of the sequence a reference to one or more data objects at least partially matching the received character and stored in connection with the CRM application wherein the data objects comprise different reports stored in the CRM application, by locating for each received character of the sequence an additional reference to one or more types of the data objects at least partially matching the received character for each located data object wherein the types of data objects comprise different types of graphs of the reports, by determining for each located data object a corresponding program module of the CRM application, by aggregating each located reference with an icon for a corresponding one of the program modules, and by displaying the aggregated reference, a description of the type of data object and icon as an activatable entry in a result set in the window wherein the aggregated reference, description and icon of a corresponding contemporaneously active program module is prioritized in the result set;

wherein for each character of the sequence, meta-data for the CRM application describing system commands of the CRM application additionally are searched to locate data objects that are system commands at least partially matching the character wherein the system commands comprise a command to create a new data object, additionally determining for each located system command data object a corresponding program module of the CRM application, by aggregating each boated system command reference with an icon for a corresponding one of the program modules, and additionally displaying the aggregated system command reference and icon as an activatable entry in the result set in the window wherein the system command reference and icon of the corresponding contemporaneously active program module is prioritized in the result set, wherein the system commands further comprise user logout, help display, system updated checking, tracking enablement and disablement, backup triggering, activation of a developer mode, de-activation of the developer mode, modification of a system logger level, changing of a time zone, building of a module by way of a module loader and the triggering of a specified workflow.

12. The computer program product of claim 11, wherein for each character of the sequence, initially a cache of previously aggregated references and icons are searched to locate the data objects partially matching the character, and subsequently a data store storing data objects for all modules of the CRM application are searched to locate the data objects partially matching the character.

13. The computer program product of claim 12, wherein each entry in the result set is placed in the cache but subsequently removed from the cache after a lapse of a threshold period of time.

14. The computer program product of claim 11, wherein an activation of an entry in the result set that is a system command results in an address being placed in an address bar of a content browser acting as a container for the CRM application so as to invoke the system command as if the system command had been manually selected in the CRM application.

15. The computer program product of claim 11, wherein an activation of an entry in the result set that is a system command results in an event being placed in an event handler for the CRM application to invoke the system command as if the system command had been manually selected in the CRM application.

* * * * *